June 6, 1961  S. ROTHBERG  2,987,042
RESTRAINING DEVICE FOR SMALL ANIMALS
Filed Dec. 10, 1958  2 Sheets-Sheet 1
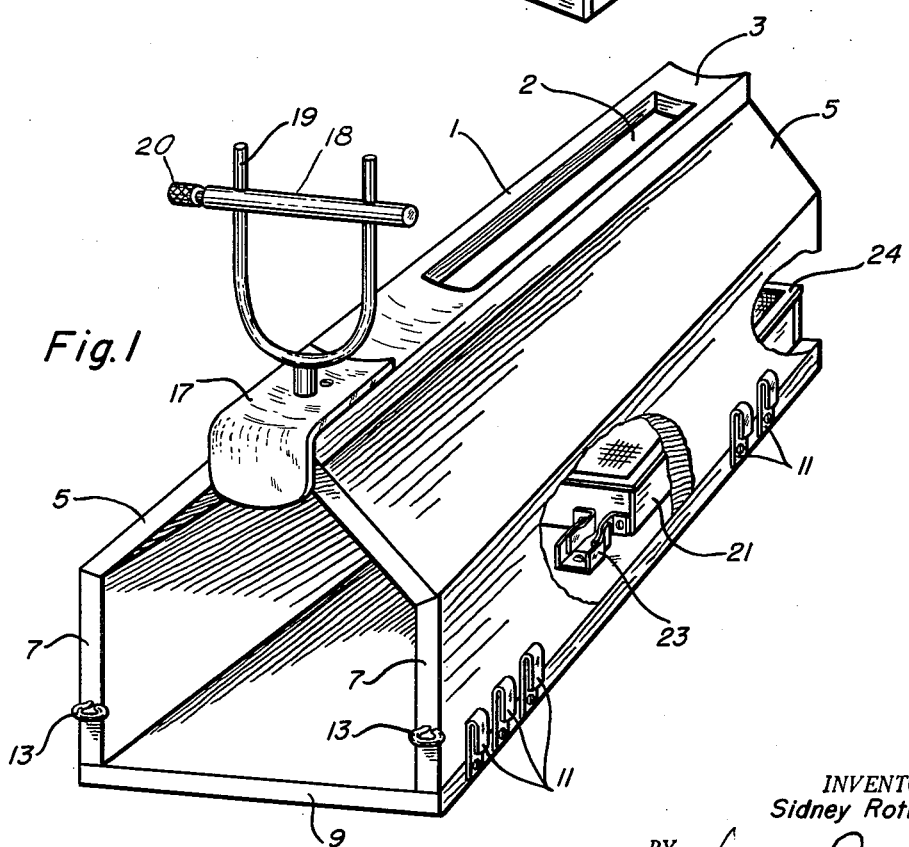
INVENTOR.
Sidney Rothberg
BY
ATTORNEY June 6, 1961  S. ROTHBERG  2,987,042
RESTRAINING DEVICE FOR SMALL ANIMALS
Filed Dec. 10, 1958  2 Sheets-Sheet 2

INVENTOR.
Sidney Rothberg
BY George Renehan
ATTORNEY

United States Patent Office 2,987,042
Patented June 6, 1961

2,987,042
RESTRAINING DEVICE FOR SMALL ANIMALS
Sidney Rothberg, 5508 Elderon Ave., Baltimore 15, Md.
Filed Dec. 10, 1958, Ser. No. 779,504
4 Claims. (Cl. 119—103)
(Granted under Title 35, U.S. Code (1952), sec. 266)

The invention herein described may be manufactured and used by or for the Government of the United States of America for governmental purposes without the payment to me of any royalty thereon.

This invention is directed to a restraining device for animals, particularly small animals, which permits them to be immobilized for long periods of time with a minimum of discomfort.

In the drawing:

FIG. 1 is a perspective view of the restraining device having a cut-away portion to show the tray assembly.

FIG. 2 is a perspective view of a drawer-like tray.

FIG. 3 is a perspective view of a basket for use in the drawer of FIG. 2.

Figure 4:
FIG. 4 is a perspective view of the restraining device showing the animal in its normal restrained position.

In conducting certain biological experiments it is necessary to restrain animals for long periods of time, e.g., 24 hours. The conventional flat restraining board has been found to cause considerable discomfort to the animals when used for these extended periods. Moreover, it frequently gives insufficient immobilization. In addition to humanitarian considerations, it is undesirable that the animals experience undue discomfort because their reaction thereto frequently produces undesirable results from an experimental standpoint. The struggles of the animal sometimes cause displacement of material applied to the skin and the stress of uncomfortable restraint may produce undesired biological reactions.

My device greatly reduces the discomfort of the animal by causing it to occupy a more natural position during restraint. Furthermore it produces very effective immobilization.

Basically, the device is a hollow structure having an upper relatively narrow main supporting surface. This supporting surface is generally horizontal but is preferably slightly concave to fit the convex ventral surface of the animal, which is placed in a natural straddling position. A secondary supporting surface is extended downwardly and outwardly from each edge of the upper supporting surface to contact the upper portion of the animal's legs.

Finally, on each side, vertical members extend downwardly from the sloping surface and are secured to a base member. Straps are fastened to the base member to engage the feet of the animal while a yoke on the upper supporting surface receives the neck and restrains the head.

As illustrated, my device which is basically constructed of wood, though other material may be used, has an upper relatively narrow main supporting member 1. This supporting member 1 has in the posterior portion a long rectangular opening 2. The upper surface 3 of this member 1 is generally horizontal but preferably slightly concave to fit a convex ventral surface of the animal, which is placed in a natural straddling position as shown in FIG. 1. Secondary sloping supporting members 5 are extended downwardly and outwardly from each edge of the upper supporting member 1. Finally on each side, vertical members 7, which extend downwardly from the sloping members 5 and are secured to a base member 9, complete the main structure of the invention.

Clips 11 fastened to the base member 9 and eye hooks 13 affixed to the vertical members 7 are provided to engage straps 15 for holding the feet of the animal. The yoke plate 17, generally made of sheet metal, is fastened on the front and upper surface of the supporting member 1, serving as a guard, while a metal yoke 19 going through the yoke plate 17 and the upper supporting member 1, and held on with a nut fastener (not shown) receives the neck of the animal. The yoke 19 has a cross bar 18 which is slidably adjustable on the yoke and is held in place by the knurled set screw 20.

A tray in form of a drawer 21 which receives excreta and slides in a drawer-like fashion beneath the opening 2 is fastened to the base member 9 with a friction type of restraining clip 23, while a stainless steel screen basket 24 is placed in the drawer 21 to separate urine from the feces.

As previously stated, the animal, occupying the position shown in FIG. 1, can be restrained for long periods without apparent discomfort.

While I have shown one embodiment of my invention it will be understood that various changes can be made. I therefore desire that the invention be limited solely by the scope of the appended claims.

I claim:

1. A device for restraining animals comprising a base member, a support having a relatively narrow, generally horizontal, upper surface and secondary members extending downwardly and outwardly from said upper supporting surface, said supporting member being mounted on said base member by means of vertical side members, neck supporting means on said upper surface and means on said base member adapted to receive and restrain each of the legs of said animal positioned on said support.

2. A device as defined in claim 1, wherein the neck supporting means comprises a yoke.

3. A device for restraining animals comprising of a hollow structure including a top member having a relatively narrow, elongated, generally horizontal, but slightly concave, upper supporting surface, two sloping members extending downwardly and outwardly from each side of said top member, two vertical side members, extending downwardly from said sloping members and a base member, said structure being so proportioned as to support the animal in a straddling position, a yoke on said top member adapted to receive and restrain the neck of the animal, and restraining means on said base member adapted to receive and restrain each of the legs of a said animal.

4. A device as defined in claim 3, wherein said top member has an elongated opening and further comprising, within said hollow structure, a removable tray positioned beneath said opening to receive excreta.

References Cited in the file of this patent

UNITED STATES PATENTS

| 1,822,206 | Ferguson | Sept. 8, 1931 |
| 2,279,012 | Packchanian | Apr. 7, 1942 |